(12) United States Patent
Lu et al.

(10) Patent No.: US 11,093,934 B2
(45) Date of Patent: Aug. 17, 2021

(54) METHOD FOR REALIZING DIGITAL CURRENCY WALLET BY USING HARDWARE, AND HARDWARE WALLET

(71) Applicant: Feitian Technologies Co., Ltd., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 16/620,918

(22) PCT Filed: May 18, 2018

(86) PCT No.: PCT/CN2018/087463
§ 371 (c)(1),
(2) Date: Dec. 10, 2019

(87) PCT Pub. No.: WO2019/033808
PCT Pub. Date: Feb. 21, 2019

(65) Prior Publication Data
US 2020/0226586 A1 Jul. 16, 2020

(30) Foreign Application Priority Data
Aug. 14, 2017 (CN) .......................... 201710690690.1

(51) Int. Cl.
*G06Q 20/36* (2012.01)
*H04L 9/08* (2006.01)
*G06Q 20/38* (2012.01)

(52) U.S. Cl.
CPC ....... *G06Q 20/367* (2013.01); *G06Q 20/3825* (2013.01); *G06Q 20/3829* (2013.01); *H04L 9/0894* (2013.01)

(58) Field of Classification Search
None
See application file for complete search history.

(56) References Cited

U.S. PATENT DOCUMENTS 8,768,834 B2 7/2014 Zacarias et al.
2016/0261411 A1* 9/2016 Yau ..................... H04L 63/0869

OTHER PUBLICATIONS

A. Antonopoulos, Mastering Bitcoin: Programming the Open Blockchain, Jul. 1, 2017, O'Reilly Media, 2nd ed., eBook (1st and 2nd eds.) (Year: 2017).*

(Continued)

*Primary Examiner* — Eric T Wong
*Assistant Examiner* — Douglas W Pinsky
(74) *Attorney, Agent, or Firm* — Hammer & Associates, P.C.

(57) ABSTRACT

Disclosed are a method for realizing a digital currency wallet by using hardware, and a hardware wallet. The method comprises: a hardware wallet waiting to receive an instruction from an upper computer, and when receiving a balance query instruction, the hardware wallet generating, according to a master key in a secure storage area and a pre-set sub-key index, a sub-key pair by means of a key derivation algorithm, generating an account address according to a sub-public key in the sub-key pair, binding the account address and the sub-key index, and returning same to the upper computer; and when receiving a transaction instruction, the hardware wallet generating, according to the master key in the secure storage area and a sub-key index in the transaction instruction, a sub-key pair by means of the key derivation algorithm, signing transaction data in the transaction instruction by using a sub-private key in the sub-key pair to obtain a signature result, generating a transaction credential according to the sub-public key in the sub-key pair, and the signature result, and returning the transaction credential to the upper computer. The present (Continued)

invention belongs to the field of digital currencies and solves the problem of security of key storage.

16 Claims, 4 Drawing Sheets

(56) References Cited

OTHER PUBLICATIONS

Bips / bip-0032.mediawiki, , Jul. 18, 2017, retrieved from: https://web.archive.org/web/20170718055826/https://github.com/bitcoin/bips/blob/master/bip-0032.mediawiki (Year: 2017).*

Bips / bip-0039.mediawiki, , Jul. 18, 2017, retrieved from: https://web.archive.org/web/20170718055831/https://github.com/bitcoin/bips/blob/master/bip-0039.mediawiki (Year: 2017).*

Bips / bip-0043.mediawiki, , May 26, 2017, retrieved from: https://web.archive.org/web/20170526003934/https://github.com/bitcoin/bips/blob/master/bip-0043.mediawiki (Year: 2017).*

Bips / bip-0044.mediawiki, , Jul. 10, 2017, retrieved from: https://web.archive.org/web/20170710205406/https://github.com/bitcoin/bips/blob/master/bip-0044.mediawiki (Year: 2017).*

T. Bamert et al., "BlueWallet: The Secure Bitcoin Wallet," in S. Mauwetal. (Eds.), Security and Trust Management, 10th International Workshop, STM 2014, Poland, Sep. 10-11, 2014, Proceedings (STM 2014, LNCS 8743), Springer, pp. 65-80, 2014 (Year: 2014).*

"Words are Hard: Defining Common Terms in the Ethereum / Crypto Space," Jul. 7, 2017, retrieved from: https://github.com/pirapira/ethereum-word-list/blob/master/README.md (Year: 2017).*

Redman, "How to Restore a Hardware Wallet Using a Seed Phrase," news.bitcoin.com, Jan. 17, 2017, retrieved from: https://news.bitcoin.com/restore-hardware-wallet-seed-phrase/ (Year: 2017).*

NIST Computer Security Division, Recommendation for Key Management—Part 1: General (Revision 3), Jul. 2012, retrieved from: https://nvlpubs.nist.gov/nistpubs/Legacy/SP/nistspecialpublication800-57p1r3.pdf (Year: 2012).*

* cited by examiner

METHOD FOR REALIZING DIGITAL CURRENCY WALLET BY USING HARDWARE, AND HARDWARE WALLET

FIELD OF THE INVENTION

The present invention relates to a method for realizing digital currency wallet via a hardware and a hardware wallet, which belongs to the field of digital currency.

PRIOR ART

Generally speaking, the digital currency wallet is in a software format in prior art, thus, a key, which is saved in a computer or a cellphone, is easily attacked or obtained illegally; meanwhile, the key cannot be recover when the cellphone is lost or computer data is destroyed.

SUMMARY OF THE INVENTION

The object of the invention is to provide a method for realizing a digital currency wallet via a hardware and a hardware wallet, which can solve the security problem of storing a key.

Thus, according one respect of the present invention, there is provided a method for realizing a digital currency wallet via a hardware, which includes:

Step S1, waiting, by the hardware wallet, for receiving an instruction from an upper computer, going to Step S2 in the case that a balance inquiring instruction is received; going to Step S3 in the case that a transaction instruction is received;

Step S2, generating, by the hardware wallet, a sub key pair via a key deriving algorithm according to a master key and a preset sub key index which are in the security storage area, generating an account address according to a sub public key in the sub key pair, binding the account address with the sub key index and returning them to the upper computer; and Step S3, generating, by the hardware wallet, the sub key pair via the key deriving algorithm according to the master key in the security storage area and the sub key index in the transaction instruction, signing on the transaction data in the transaction instruction by using the sub private key in the sub key pair to obtain a signature result, generating a transaction credential according to the sub public key in the sub key pair and the signature result, and returning the transaction credential to the upper computer.

According to the other respect of the present invention, there is provided a hardware wallet, which specifically includes:

a receiving module which is configured to receive an instruction from an upper computer;

a security storage module which is configured to store the master key generated by a master key generating module;

a first sub key pair generating module which is configured to generate a sub key pair according to the master key stored in the security storage area and a preset sub key index via a key deriving algorithm when the receiving module receives a balance inquiring instruction sent from the upper computer;

an account address generating module which is configured to generate an account address according to the sub public key in the sub key pair generated by the sub key generating module;

a second sub key pair generating module which is configured to generate the sub key pair according to the sub key index in the transaction instruction and the master key stored in the security storage module via the key deriving algorithm when the receiving module receives the transaction instruction sent by the upper computer;

the signing module which is configured to sign on the transaction data in the transaction instruction received by the receiving module by using the sub private key generated by the second sub key pair generating module to obtain the signature result;

a transaction credential generating module which is configured to generate a transaction credential by using the sub public key of the sub key pair generated by the second sub key pair generating module and the signature result generated by the signing module; and a sending module which is configured to bind the account address generated by the account address generating module with the preset sub key index, and send them to the upper computer; is further configured to send the transaction credential generated by the transaction credential generating module to the upper computer.

According to the present invention, a digital currency private key is stored in the hardware, in this way, the digital currency private key is safer. All operations participated by the digital private key are executed inside the hardware, thus, the private key cannot be out of the hardware wallet, that makes the private key safer by this disclosure.

BRIEF DESCRIPTION OF ACCOMPANYING DRAWINGS

DETAILED DESCRIPTION OF THE INVENTION

The technical solution in the Embodiment of the present invention is further described more clearly and completely with the drawings of the present invention. Apparently, Embodiments described herein are just a few Embodiments of the present invention. On the basis of Embodiment of the invention, all other related Embodiment made by those skilled in the art without any inventive work belong to the scope of the invention.

Embodiment 1

Figure 1:
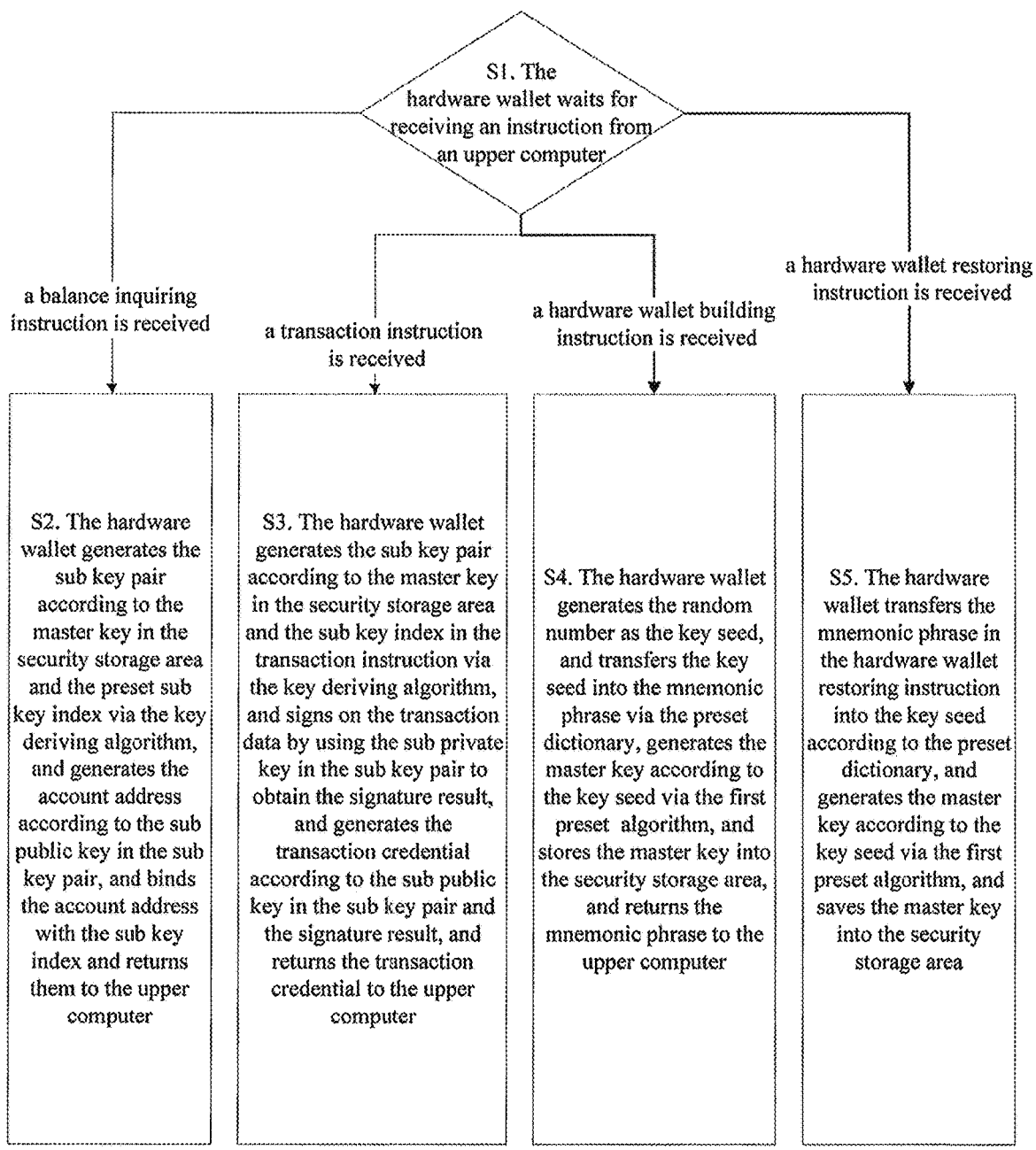
FIG. 1 shows a flow diagram of a method for realizing digital currency via a hardware according to Embodiment 1 of the present invention.

It provides a method for realizing digital currency wallet via hardware according to Embodiment 1, as shown in FIG. 1, which includes:

Step S1, hardware wallet waits for receiving an instruction from the upper computer, goes to Step S2 in the case that a balance inquiring instruction is received; goes to Step S3 in the case that a transaction instruction is received; goes to Step S4 in the case that a hardware wallet building instruction is received; goes to Step S5 in the case that a hardware wallet restoring instruction is received;

Specifically, Step S1 specifically is that in the case that the hardware wallet receives the instruction from the upper computer, data on a first preset field of the instruction is obtained, and is made as an identification for type of instruction, and a type of instruction is determined according to the identification for type of instruction; in the case that the identification for type of instruction is a first preset identification for type of instruction, the type of instruction is the hardware wallet building instruction, Step S4 is executed; in the case that the identification for type of instruction is a second preset identification for type of instruction, the type of instruction is the hardware wallet restoring instruction, and Step S5 is executed; in the case that the identification for type of instruction is a third preset identification for type of instruction, the type of instruction is the balance inquiring instruction, Step S1 is executed; in the case that the identification for type of instruction is a fourth preset identification for type of instruction, the type of instruction is the transaction instruction, Step S2 is executed.

Step S2, the hardware wallet generates a sub key pair via a key deriving algorithm according to a master key in the security storage area and a preset sub key index, and generates an account address according to the sub public key in the sub key pair, binds the account address with the sub key index and returns them to the upper computer;

when the balance inquiring instruction is received, before Step S2 is executed, the method further includes that the hardware wallet determines whether the master key is in the secure storage area, if yes, goes to Step S2; otherwise, returns a failure response to the upper computer.

Specifically, the hardware wallet generating the sub key via the key deriving algorithm according to the master key in the security storage area and the preset sub key index in Step S2 in Embodiment 1 specifically includes:

Step 401, the hardware wallet generates a public key according to the master key in the security storage area, sets a current sub key index as a preset value;

Step 402, the hardware wallet generates the sub key pair via the key deriving algorithm according to the public key and the current sub key index;

Step 403, the hardware wallet generates the account address via a preset algorithm according to the sub public key of the sub key pair, binds the account address with the current sub key index and writes them into a sub key index table;

Step 404, the hardware wallet updates the current sub key index, and determines whether the current sub key index is smaller than the preset value, if yes, returns the sub key index table to the upper computer; otherwise, returns a failure response to the upper computer.

Specifically, generating the account address according to the sub public key in the sub key pair in Step 403 specifically includes that the hardware wallet executes SHA256 operation and RIPEMD160 operation and coding operation on the sub public key successively to generate a first data which is made as the account address.

Step S3, the hardware wallet generates the sub key pair via the key deriving algorithm according to the master key in the security storage area and the sub key index in the transaction instruction, signs on the transaction data in the transaction instruction by using the sub private key in the subkey pair to obtain a signature result, generates a transaction credential according to the sub public key in the sub key pair and the signature result, and returns the transaction credential to the upper computer.

Preferably, in the case that the transaction instruction is received, and before Step S3, the method further includes that the hardware wallet determines whether the master key exists in the security storage area, if yes, goes to Step S3; otherwise, returns the failure response to the upper computer.

Specifically, the hardware wallet generating the sub key pair via the key deriving algorithm according to the master key in the security storage area and the sub key index in the transaction instruction in Step S3 specifically includes that the hardware wallet generating a public key according to the master key in the security storage area, and generating the sub key pair according to the public key and sub key index via the key deriving algorithm.

Specifically, generating the transaction credential according to the sub public key in the sub key pair and the signature result in Step S3 specifically includes that the hardware wallet calculates to obtain a length of the transaction credential according to a length of the sub public key in the sub key pair, sub public key, a length of the signature result and the signature result; and generating the transaction instruction by joining the length of the transaction credential, the length of sub public key, the sub public key, the length of signature result and the signature result.

Step S4, the hardware wallet generates a random number as a key seed, transfers the key seed into a mnemonic phrase via a preset dictionary, generates the master key from the key seed via the first preset algorithm, stores the master key into the security storage area, and returns the mnemonic phrase to the upper computer;

furthermore, in the case that the hardware wallet building instruction includes a hardware wallet password, after the hardware wallet building instruction is received, and before Step S4, the method further includes that the hardware wallet obtains the hardware wallet password from the hardware wallet building instruction, determines whether the hardware wallet password is legitimate, if yes, goes to Step S4; otherwise, prompts the password is incorrect, the method comes to an end.

Specifically, the hardware wallet generating the random number as the key seed, and transferring the key seed into the mnemonic phrase via the preset dictionary in Step S4 specifically includes:

Step 101, the hardware wallet generates a random number of a first preset length, and makes the random number as the key seed;

Step 102, the hardware wallet obtains a first check value via a second preset algorithm according to key seed; obtains a mnemonic phrase identification by joining the key seed and the first check value; and transfers the mnemonic phrase identification into the mnemonic phrase according to the preset dictionary.

Furthermore, Step 102 specifically is that the hardware wallet obtains a calculation result via the second preset algorithm according to the key seed, calculates to obtain the length of the check value according to the first preset length, orderly intercepts data whose length equals the length of the check value from the calculation result as the first check value, and obtains the mnemonic phrase identification by joining the key seed and the first check value.

In the case that the hardware wallet building instruction includes the length of the mnemonic phrase, the hardware wallet generating the random number as the key seed and transfers the key seed into the mnemonic phrase via the preset dictionary in Step S4 specifically includes:

Step 201, the hardware wallet calculates to obtain a length of the key seed according to the length of the mnemonic phrase, generates a random whose length equals the length of key seed, and makes the random as the key seed;

Furthermore, Step 201 specifically includes: the hardware wallet calculates to obtain the length of the key seed and the length of the check value according to the length of the mnemonic phrase, generates the random number whose length equals the length of the key seed, and makes the random number as the key seed;

Step 202, the hardware wallet obtains the first check value via the second preset algorithm according to the key seed; obtains the mnemonic phrase identification by joining the key seed with the first check value; transfers the mnemonic phrase identification into the mnemonic phrase according to the preset dictionary.

Furthermore, Step 202 specifically includes that the hardware wallet obtains the calculation result via the second preset algorithm according to the key seed, orderly intercepts data whose length equals the length of check value from the calculation result as the first check value; obtains the mnemonic phrase identification by joining the key seed with the first check value; and transfers the mnemonic phrase identification into the mnemonic phrase according the preset dictionary.

Furthermore, transferring the mnemonic phrase identification into the mnemonic phrase according to the preset dictionary in Step 102 or Step 202 specifically includes that the hardware wallet successively intercepts the data whose length is the second preset length from the mnemonic phrase identification as a mnemonic word identification, looks up from the preset dictionary and intercepts a mnemonic word corresponding to the mnemonic word identification, constitutes the mnemonic words successively into the mnemonic phrase.

Correspondingly, generating the master key with the key seed via the first preset algorithm in Step S4 specifically includes that the hardware wallet makes a preset character string as a hash key, and calculates to obtain a hash value of the key seed according to the second preset algorithm; and makes the data of the second preset length from a high-order end of the hash value as the master key.

In the case that the hardware wallet building instruction further includes a language type of the mnemonic phrase, correspondingly, Step S4 specifically includes that the hardware wallet generates the random number as the key seed, transfers the master key into the mnemonic phrase via the dictionary corresponding to the language type of the mnemonic phrase, returns the mnemonic phrase to the upper computer.

Step S5, the hardware wallet transfers the mnemonic phrase in the hardware wallet restoring instruction into the key seed according to the preset dictionary, generates the master key with the key seed via the first preset algorithm, and stores the master key into the secure storage area.

Specifically, the hardware wallet determining the language type of mnemonic phrase according to the mnemonic phrase includes that the hardware wallet obtains a mnemonic word in the mnemonic phrase and determines the language type of the mnemonic word according to a unicode code of the mnemonic phrase.

Specifically, the hardware wallet transferring the mnemonic phrase in the hardware wallet restoring instruction into the key seed according to the preset dictionary in Step S5 specifically includes that the hardware wallet transferring the mnemonic phrase into a mnemonic phrase identification according to the preset dictionary; calculating to obtain a length of the key seed according to a length of the mnemonic phrase identification and orderly obtaining data whose length equals the length of the key seed from the mnemonic phrase identification and making the data as the key seed.

Specifically, the hardware wallet transferring the mnemonic phrase in the hardware wallet restoring instruction into the key seed according to the preset dictionary in Step S5 specifically includes that the hardware wallet transferring the mnemonic phrase in the hardware wallet restoring instruction into the mnemonic phrase identification according to the preset dictionary, and obtaining the key seed and the second check value from the mnemonic phrase identification;

More specifically, obtaining the key seed and the second check value from the mnemonic phrase identification specifically includes that calculating to obtain the length of the key seed according to length of the mnemonic phrase identification, and orderly obtaining the data whose length equals the length of the key seed as the key seed, and making the left data as the second check value.

Correspondingly, after obtaining the key seed and the second check value from the mnemonic phrase identification, and before generating the master key from the key seed via the first preset algorithm, the method further includes that the hardware wallet generating a third check value according to the key seed, determining whether the third check value matches with the second check value, if yes, generating the master key from the key seed via the first preset algorithm; otherwise, returning a failure response to the upper computer.

Specifically, the hardware wallet generating the third check value according to the key seed specifically includes that executing calculation on the key seed via the first preset algorithm to obtain a calculation result, orderly intercepting from the calculation result data whose length equals the length of the check value as the third check value;

Preferably, after receiving the hardware wallet restoring instruction, before Step S5, the method further includes that the hardware wallet determining whether the number of the mnemonic words in the mnemonic phrase in the hardware wallet restoring instruction is more than a third preset value, if yes, going to Step S5; otherwise, returning the failure response to the upper computer.

Preferably, after receiving the hardware wallet restoring instruction, before Step S5, the method further includes that the hardware wallet determining the language type of the mnemonic phrase according to the mnemonic phrase, determining whether the language type of the mnemonic phrase is in the scope of the preset language types, if yes, going to Step S5; otherwise, returning the failure response to the upper computer.

Embodiment 2

Figure 2:
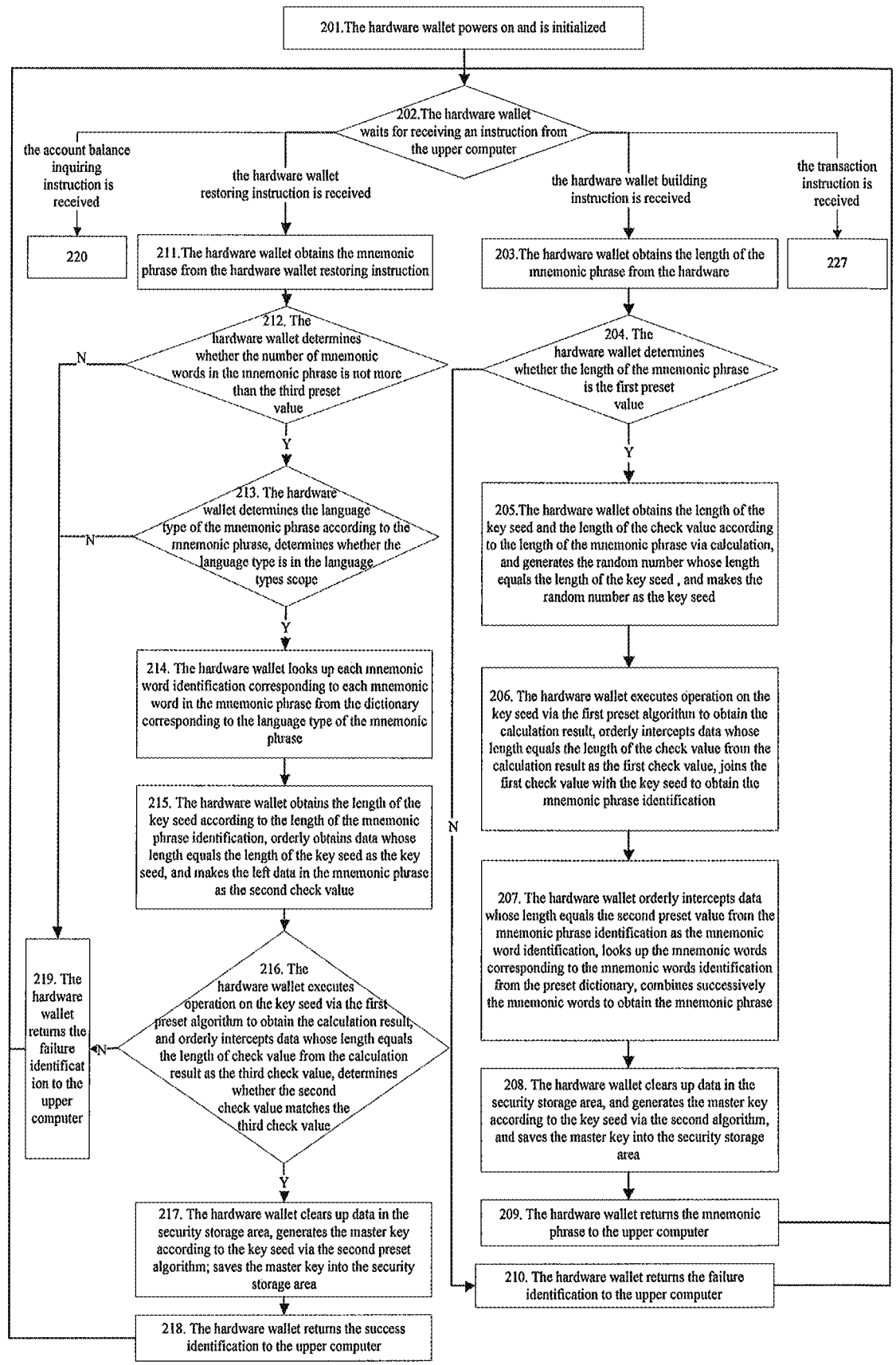
FIG. 2 to FIG. 3 show a flow diagram of a method for realizing digital currency via a hardware according to Embodiment 2 of the present invention.
Figure 3:
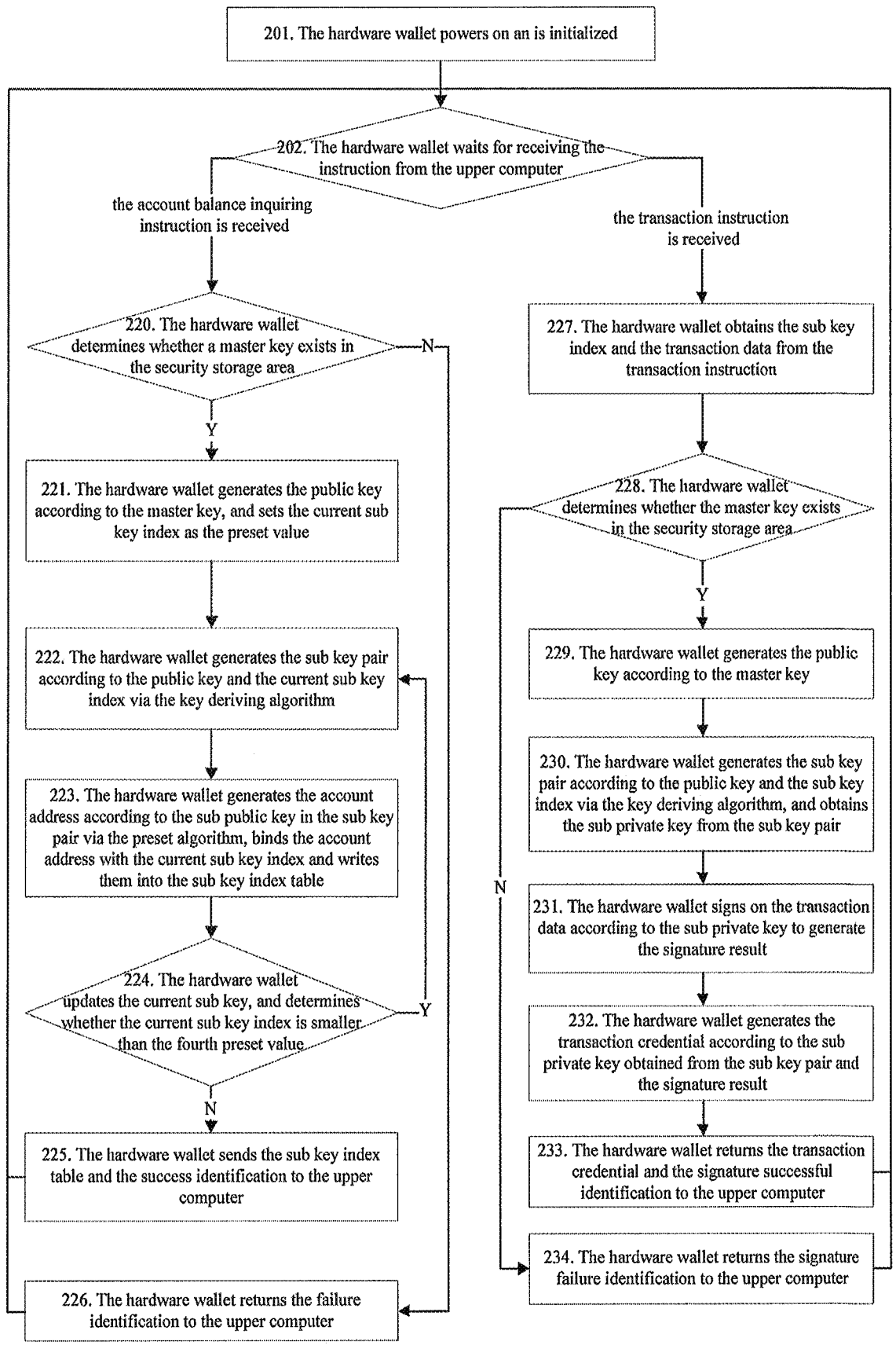

It provides a method for realizing a digital currency wallet via a hardware according to Embodiment 2, as shown in FIG. 2 and FIG. 3, the method comprises:

Step 201, a hardware wallet powers on and is initialized;

Step 202, the hardware wallet waits for receiving an instruction from the upper computer, and goes to Step 203 when a hardware wallet building instruction is receive; goes to Step 211 when a hardware wallet restoring instruction is received; goes to Step 220 when an account balance inquiring instruction is received; goes to Step 227 when a transaction instruction is received;

Specifically, the hardware wallet waits for receiving an instruction from the upper computer, obtains data on the first preset field from the instruction when the instruction is received and makes the data as an instruction type identification, determines a type of the instruction according to the instruction type identification; goes to Step 203 when the instruction type identification is a first preset instruction type identification which means the type of the instruction is the hardware wallet building instruction; goes to Step 211 when the instruction type identification is a second preset instruction type identification which means the type of the instruction is the hardware wallet restoring instruction; goes to Step 220 when the instruction type identification is a third preset instruction type identification which means the type of the instruction is the account balance inquiring instruction; goes to Step 227 when the instruction type identification is a fourth preset instruction type identification which means the type of the instruction is the transaction instruction.

In Embodiment 2, the first preset field can be but not limited to be the first four bytes of the instruction. The first preset instruction type identification can be but not limited to be "0X 00460000", the second preset instruction type identification can be but not limited to be "0X 00C40000", the third preset instruction type identification can be but not limited to be "0X 00F60000", the fourth preset instruction type identification can be but not limited to be "0X 002A0100".

For instance, the hardware wallet waits for receiving the instruction"0X 00460000530400074F05626C7573680474 61706505636C756D7007736C656E6465720570756E6368046F76657207 72656363656976650668656967687405762696F6C6F6779 0773656374696F E04636F6F6B066F70 74696F6E" from the upper computer, when the instruction is received from the upper computer, the data on the first fourth bytes of the instruction is obtained and made as the instruction type identification, in which, the instruction type identification is the first preset instruction type identification, thus the type of the instruction is the hardware wallet building instruction, and Step 203 is executed.

Step 203, the hardware wallet obtains the length of the mnemonic phrase from the hardware wallet building instruction;

For instance, the length of the mnemonic phrase obtained by the hardware wallet from the hardware wallet building instruction is 24.

Preferably, the hardware wallet building instruction further includes a hardware wallet password; correspondingly, between Step 202 and Step 203, the method further includes that the hardware wallet obtains the hardware wallet password from the hardware wallet building instruction, determines whether the hardware wallet password is legitimate, if yes goes to Step 203; otherwise, prompts that the password is incorrect, then the method comes to an end.

Step 204, the hardware wallet determines whether the length of the mnemonic phrase is the first preset value, if yes, goes to Step 205; otherwise, goes to Step 210;

the length of the mnemonic phrase specifically is the number of the mnemonic words included in the mnemonic phrase;

the first preset value specifically is 12, 15, 18, 21 or 24;

Step 205, the hardware wallet executes calculation to obtain the length of the key seed and the length of the check value according to the length of the mnemonic phrase; generates a random number whose length equals the length of the key seed, and makes the random number as the key seed;

Specifically, the hardware wallet multiply the length of the mnemonic phrase by the second preset value to generate the length of the mnemonic phrase identification; the second preset value is a bit number of a mnemonic word identification in the preset dictionary of each mnemonic word in the mnemonic phrase; the second preset value in the Embodiment 2 is 11 bit; in Embodiment 2, the length of the mnemonic phrase identification, obtained by the length of the mnemonic phrase, which is 24, multiplying by the second preset value, is 264 bit;

The length of the mnemonic phrase identification equals the length of the key seed plus the length of the check value, and the ratio of the length of the check value in the length of the key seed is 1:32, thus, the length of the key seed and the length of the check value can be obtained according to the length of the mnemonic phrase identification; in Embodiment 2, the length of the key seed is 256 bit, the length of the check value is 8 bit.

Then, the hardware wallet uses a random number generator to generate a random number whose length equals the length of the key seed which is 256 bit; for instance, the key seed in Embodiment 2 specifically is 0X 6c 55 44 79 7a 91 11 5d c3 33 0e bd 00 38 51 d2 39 a7 06 ff 2a a2 ab 70 03 9c 55 10 dd f0 64 20;

Step 206, the hardware wallet executes calculation on the key seed via the first preset algorithm to obtain a calculation result, orderly intercepts data, whose length equals the length of the check value, from the calculation result as the first check value, and joints the first check value behind the key seed to obtain the mnemonic phrase identification;

In Embodiment 2, the first preset algorithm can be but not limited be SHA256 algorithm.

Specifically, the hardware wallet executes calculation on the key seed by using SHA256 algorithm to obtain the calculation result, orderly intercepts the data whose length equals the length of the check value from the calculation result as the first check value, and joints the first check value behind the key seed as the mnemonic phrase identification.

For instance, the hardware wallet executes hash algorithm on the key seed "0X 6c5544797a9 1115dc3330ebd003851d239a706ff2aa2ab70039c55 10ddf06420" by using SHA256 algorithm to obtain the calculation result which is 0X dcd2f3552379d262d16d46dafd8c2fd3f49619e5ae70bb98 ba816d74e868f4fb, orderly intercepts data whose length equals the length of the check value from the calculation result as the first check value which is 0X dc, joints the first check value which is 0X dc behind the key seed which is 0X 6c5544797a91115dc3330ebd003851d239a706ff2aa2ab7 0039c5510dd106420 to obtain the mnemonic phrase identification which is 0X 6c5544797a91115 dc3330ebd003851d239a706ff2aa2ab70039c5510dd fD6420dc.

Step 207, the hardware wallet intercepts orderly data whose length equals the second preset value from the mnemonic phrase identification as the mnemonic word identification, looks up the mnemonic word corresponding to the mnemonic word identification from the preset dictionary, successively combines the mnemonic words to obtain the mnemonic phrase;

Step 208, the hardware wallet clears data in the security storage area, generates the master key according to the key seed via the second preset algorithm, and stores the master key into the security storage area;

Specifically, Step 208 specifically is that the hardware wallet uses a preset character string as a hash key, calculates to obtain a hash value of the key seed according to the second preset algorithm; and makes data on the high-order end whose length equals the preset length from the obtained hash value as the master key;

in Embodiment 2, the second preset algorithm preferably is HMAC-SHA512 algorithm.

in Embodiment 2, the data on the high-order end whose length equals the preset length preferably is the data on the high-256 bit, the data on the low-order end whose length equals the preset length preferably is the data on the low-256 bit.

For instance, the preset character string is ASCII code of Bitcoin seed, thus, the hash value obtained by calculating is 0X 6c5544797a91115dc3330ebd003851d239a706ff2aa 2ab70039c55 10ddf06420920ad779104398edc710c1641ef21abb2 a198620cc32356e d285499caa301241; the high-256 bit of the hash value is made as the master key, thus, the master key is 0X 6c 55 44 79 7a91 11 5dc3 33 0e bd 00 38 51 d2 39 a7 06 ff 2aa2 ab 70 03 9c55 10 dd f0 64 20.

It needs to be noted that the sequence of Step 208 and steps from Step 206 to Step 207 can be interchanged.

In Embodiment 2, the second preset value is 11 bit, for instance, the hardware wallet orderly intercepts data whose length is 11 bit from the mnemonic phrase identification which is 0X 6c5544797a91115dc3330ebd003851d239a706ff2aa2 ab70039c5510ddfD6420dc, the data obtained by intercepting is 0110 1100 010/1 0101 0100 01/00 0111 1001 0/111 1010 1001/0001 0001 000/1 0101 1101 11/00 0011 0011 0/011 0000 1110/1011 1101 000/0 0000 0011 10/00 0101 0001 1/101 0010 0011/1001 1010 011/1 0000 0110 11/11 1111 0010 1/010 1010 0010/1010 1011 011/1 0000 0000 00/11 1001 1100 0/101 0101 0001/0000 1101 110/1 1111 0000 01/10 0100 0010 0/000 1101 1100, the mnemonic word, which corresponds to the mnemonic word identification, found from the preset dictionary is tube/adjust/curious/ this/either/banner/cave/engage/treat/stem/whisper/swamp/ walnut/box/balcony/never/volume/ordinary/raw/welcome/ until/easily/because/few, the mnemonic phrase obtained by successively combining the mnemonic word is tube adjust curious this either banner cave engage treat stem whisper swamp walnut box balcony never volume ordinary raw welcome until easily because few;

preferably, the hardware wallet building instruction further includes that a language type which specifically includes simplified Chinese, Chinese traditional and English;

correspondingly, Step 208 specifically is that the hardware wallet successively intercepts data whose length equals the second preset value from the mnemonic phrase identification, looks up the mnemonic word corresponding to the mnemonic word identification from the dictionary corresponding to the language type of the mnemonic phrase in the hardware wallet building instruction, and successively combines the mnemonic words to obtain the mnemonic phrase;

Step 209, the hardware wallet returns the mnemonic phrase to the upper computer, and returns to Step 202;

Step 210, the hardware wallet returns a failure identification to the upper computer, and returns to Step 202;

Step 211, the hardware wallet obtains the mnemonic phrase from the hardware wallet restoring instruction;

for instance, the mnemonic phrase obtained from the hardware wallet restoring instruction is tube adjust curious this either banner cave engage treat stem whisper swamp walnut box balcony never volume ordinary raw welcome until easily because few.

Step 212, the hardware wallet determines whether the number of the mnemonic words included in the mnemonic phrase is more than the third preset value, if yes, goes to Step 213; otherwise, goes to Step 219;

Specifically, the third preset value is the preset maximum length of the mnemonic phrase, in Embodiment 2, the third preset value is 24;

Step 213, the hardware wallet determines the language type of the mnemonic phrase according to the mnemonic phrase, determines whether the language type of the mnemonic phrase belongs to the scope of the preset language type, if yes, goes to Step 214; otherwise, goes to Step 219;

Specifically, the hardware wallet obtains one mnemonic word from the mnemonic words, determines the language type of the mnemonic phrase according to the Unicode code of the mnemonic word, determines whether the language type of the mnemonic phrase is one sort of the simplified Chinese, traditional Chinese or English, if yes, determines that the language type of the mnemonic phrase belongs to the scope of the preset language types; otherwise, determines that the language type of the mnemonic phrase does not belong to the scope of the preset language types.

Step 214, the hardware wallet looks up each mnemonic word identification corresponding to the each mnemonic word in the mnemonic phrase from the dictionary corresponding to the language type of the mnemonic phrase, and joints each mnemonic word identification to obtain the mnemonic phrase identification;

For instance, the hardware wallet clears up the data in the security storage area, looks up each mnemonic word identification corresponding to each mnemonic word respectively, which for example is looking up 0110 1100 010/1 0101 0100 01/00 0111 1001 0/111 1010 1001/0001 0001 000/1 0101 1101 11/00 0011 0011 0/011 0000 1110/1011 1101 000/0 0000 0011 10/00 0101 0001 1/101 0010 0011/ 1001 1010 011/1 0000 0110 11/11 1111 0010 1/010 1010 0010/1010 1011 011/1 0000 0000 00/11 1001 1100 0/101 0101 0001/0000 1101 110/1 1111 0000 01/10 0100 0010 0/000 1101 1100 corresponding to tube/adjust/curious/this/ either/banner/cave/engage/treat/stem/whisper/swamp/walnut/box/balcony/never/volume/ordinary/raw/welcome/until/ easily/because/few respectively; joints each mnemonic word identification to obtain the mnemonic phrase identification, which for example is jointing 0110 1100 010/1 0101 0100 01/00 0111 1001 0/111 1010 1001/0001 0001 000/1 0101 1101 11/00 0011 0011 0/011 0000 1110/1011 1101 000/0 0000 0011 10/00 0101 0001 1/101 0010 0011/1001 1010 011/1 0000 0110 11/11 1111 0010 1/010 1010 0010/1010 1011 011/1 0000 0000 00/11 1001 1100 0/101 0101 0001/ 0000 1101 110/1 1111 0000 01/10 0100 0010 0/000 1101 1100 to obtain 0X 6c5544797a91115dc3330ebd003851d239a706ff2 aa2ab70039c5510ddf06420dc;

Step 215, the length of the key seed is obtained by calculating according to the length of the mnemonic phrase identification, data whose length equals the length of the key seed is orderly obtained from the mnemonic phrase identification, and the left data in the mnemonic phrase identification as the second check value;

in which, obtaining the length of the key seed by calculating according to the length of the mnemonic phrase identification specifically is that the length of the mnemonic phrase identification equals the length of the key seed plus the length of the check value, and the ration of the length of the key seed and the length of the check value is 32:1, thus the length of the key seed and the length of the check value can be obtained according to the length of the mnemonic phrase identification; in Embodiment 2, the length of the key seed is 256 bit, the length of the check value is 8 bit, data on the first 256 bit of the mnemonic phrase identification which is 0X 6c5544797a91115dc3330ebd00 3851d239a706ff2aa2ab70039c5510ddf06420dc, obtained in Step 215 is made as the key seed is obtained as the key seed, thus the key seed specifically is 0X 6c55 44 79 7a91 11 5dc3 33 0e bd 00 38 51 d2 39 a7 06 ff 2aa2 ab 70 03 9c55 10 dd f0 64 20; data on the last 8 bit of the mnemonic phrase identification is made as the second check value;

Step 216, the hardware wallet uses the first preset algorithm to execute calculation on the key seed to obtain the calculation result, orderly intercepts data whose length equals the length of the check value from the calculation result as a third check value, determines whether the second check value matches the third check value, if yes, goes to Step 217; otherwise, goes to Step 219;

For instance, the hardware wallet uses SHA256 algorithm to execute calculation on the key seed to obtain the calculation result which is 0X dcd2f3552379d262d16d46dafd8c2fd3f49619e5ae 70bb98ba816d74e868f4fb, intercepts the first 8 bit of the calculation result as the third check value, if determines that the second check value 0X dc matches the third check value, goes to Step 218.

Step 217, the hardware wallet clears up the data in the security storage area, generates the master key according to the key seed via the second preset algorithm, and stores the master key into the security storage area;

Specifically, Step 217 is that the hardware wallet uses a preset character string as a hash key, calculates to obtain a hash value of the key seed according to the second preset algorithm; makes data on the high-order end, whose length equals the preset length, of the hash value as the master key;

in Embodiment 2, the second preset algorithm preferably is HMAC-SHA512 algorithm.

in Embodiment 2, the data on the high-order end, whose length equals the preset length is preferably the data on the high-256 bit, meanwhile the data on the low-order end whose length equals the preset length is preferably the data on the low-256 bit.

For instance, in the case that the preset character string is ASCII code of Bitcoin seed, the hash value obtained via calculation is 0X 6c5544797a91115dc3330ebd003851d239a706ff2aa2ab 70039 c5510ddf06420920ad779104398edc710c1641ef21abb2a 198620cc32356e d285499caa301241; the high-256 bit of the hash value is made as the master key, thus, the master key is 0X 6c 55 44 79 7a91 11 5dc3 33 0e bd 00 38 51 d2 39 a7 06 ff 2aa2 ab 70 03 9c55 10 dd f0 64 20.

Step 218, the hardware wallet returns a success identification to the upper computer, and returns to Step 202;

Step 219, the hardware wallet returns a failure identification to the upper computer, and returns to Step 202;

Step 220, the hardware wallet determines whether a master key exists in the security storage area, if yes, goes to Step 221; otherwise, goes to Step 226;

Step 221, the hardware wallet generates a public key according to the master key, and sets a current sub-key index as a preset value;

Specifically, the hardware wallet executes Elliptic curve cryptography (ECC) point multiplication on the master key and an elliptic curve base point to obtain the public key;

Step 222, the hardware wallet generates a sub-key pair according to the public key and the current sub-key index via the key deriving algorithm;

Step 222 specifically is that the public key and the current sub-key index are orderly jointed to obtain jointed data, a parent chain code is made as a hash key, the jointed data is executed to obtain a hash value of the jointed data according to the preset algorithm, the hash value is intercepted to obtain a sub-chain code, the left data is executed via ECC additive modular, if the result is not the preset value, the preset value is made as the sub private key, executes ECC point multiplication on the sub private key to obtain the sub public key.

Step 223, the hardware wallet generates an account address according to the sub public key in the sub key pair via the preset algorithm, binds the account address with the current sub key index and writes them into a sub key index table;

specifically, the hardware wallet successively executes SHA256 and RIPEMD160 on the sub public key to generate a first data of 160 bits which equals 20 bytes, and makes the first data as the account address;

preferably, after the first data is generated, the first data is executed on Base58Check code to obtain a result, the result is added a leading byte and a check byte of 4 bytes to generate a second data which is made as the account address; the leading byte means which script is supported.

Step 224, the hardware wallet updates the current sub key index, determines whether the current sub key index is smaller than the preset value, if yes, returns to Step 222; otherwise, goes to Step 225;

Step 225, the hardware wallet sends the sub key index table and a success identification to the upper computer, returns to Step 202;

Step 226, the hardware wallet returns a failure identification to the upper computer, and returns to Step 202;

Step 227, the hardware wallet obtains the sub key index and the transaction data from the transaction instruction;

specifically, the transaction data includes a last-time transaction data, the account address, and transaction amount; the last-time transaction data specifically is HASH value in the last-time transaction;

in Embodiment 2, the received transaction data specifically is 0X 01000000 01 c9f3b07ebfca 68fd1a6339d0808fbb013c90c6095fc93901ea7741010 3489ab7 00000000 ffffffff 0100bd0105000 00000 1976a9 14 634228c26cf40a02a05db93f2198b768a8e0e61b 88ac 00000000;

in which, the bytes from the sixth byte to the thirty-seventh byte which is 0X c9f3b07ebfca68 fd1a6339d0808fbb013c90c6095fc93901ea774101 03489ab7 is the last-time transaction data; the bytes from the forty-seventh byte to the fifty-fourth byte which is 0X 00bd010500000000 is the transaction amount; the bytes from the fifty-ninth byte to the seventy-eighth byte which is 0X 634228c26cf40a02a05db93f2f98b768a8e0e61b is the account address;

Step 228, the hardware wallet determines whether the master key exists in the security storage area, if yes, goes to Step 229; otherwise, goes to Step 234;

Step 229, the hardware wallet generates the public key according to the master key; specifically, the hardware wallet executes ECC point multiplication on the master key and the elliptic curve base point to obtain the public key;

Step 230, the hardware wallet generates a sub key pair according to the public key and the sub key index via a key deriving algorithm; and obtains the sub private key from the sub key pair;

Step 230 specifically is that the public key and the current sub key index are orderly jointed to obtain jointed data, the parent chain code is made as the hash key, and the jointed data is calculated via the preset algorithm to obtain a hash value, the hash value is intercepted to obtain a sub chain code, the left data is executed on ECC additive modular to obtain a result, if the result is not the preset value, the result is made as the sub private key, the sub private key is executed on ECC point multiplication to obtain the sub public key.

Step 231, the hardware wallet signs on the transaction data according to the sub private key to generate a signature result.

Specifically, the sub private key signs on the transaction data via the ellipse curve digital signature algorithm, for instance, in Embodiment 2, the sub private key which is 256 bits is 0X 6c5544797a91115dc3330ebd003851d239a706ff2aa2ab70039c5510ddf06420; the transaction data is 0X 0100000001c9f3b07ebfca68fd1a6339d0808fbb013c90c6095fc93901ea77410103489ab7000000ffffffff0100bd01050000000001976a914634228c26cf40a02a05db93f2f98b768a8e0e61b88ac00000 000; thus, the signature result generated is 0X 048aefd78bba80e2d1686225b755dacea890c9ca1bel0ec98173d7d5f2fefbbf881a6e918f3b051f8aaaa3fcc18bbf65097ce8d30d5a7e5ef8d1005eaafd4b3fb e.

Step 232, the hardware wallet generates a transaction credential according to the sub private key obtained from the sub key pair, the sub public key and the signature result;

Specifically, the hardware wallet obtains a length of the transaction credential according to a length of the sub public key, the sub public key, a length of the signature result and the signature result; the transaction credential is generated by successively jointing the length of the transaction credential, the length of the sub public key, the sub public key the length of the signature result and the signature result;

For instance, the transaction credential obtained in Embodiment 2 specifically is 0X 8a473044022055bac1856ecbc377dd5e869b1a84ed1d5228c987b098c095030c12431a4d524902205552313 0a9d0af5fc27828aba43b464ecb1991172ba2a509b5fbd6cac97ff3af0141048aefd78bba80e2d1686225b755dacea890c9ca1be10ec98173d7d5f2fefbbf881a6e918f3b051f8aaaa3fcc18bbf65097ce8d30d5a7e5ef8d1005eaafd4b3fbe;

in which, 8a means that the length of the transaction credential is 1104 bits, 8a=138 bytes=1104 bits, 8a, which is 16 bits, is not included in the length of the transaction credential.

47 means the length of the sub public key is 568 bits, 47=71 bytes=568 bits;

the sub public key is 0X 3044022055bac1856ecbc377dd5e869b1a84ed1d5228c987b098c095030c12431a4d5249022062723130a9d0af5fc27828aba43b464ecb1991172ba2a509b5fbd6cac97ff3af01 which is 568 bits;

41 means the length of the signature result, 41=65 bytes=520bits;

the signature result is 0X 048aefd78bba80e2d1686225b755dacea890c9ca1be10ec98173d7d5f2fefbbf881a6e918f3b051f8aaaa3fcc18bbf65097ce8d30d5a7e5ef8d1005eaafd4b3fbe which is 520 bits.

Step 233, the hardware wallet returns the transaction credential and a signature successful identification to the upper computer, and returns to Step 202;

in Embodiment 2, after the sub private key is generated, Step 230 further includes that saves the sub private key, correspondingly, in Step 233, before the transaction credential and the signature successful identification is returned to the upper computer, the sub private key is cleared up.

Step 234, the hardware wallet returns a signature failure identification to the upper computer, and returns to Step 202.

Embodiment 3

Figure 4:
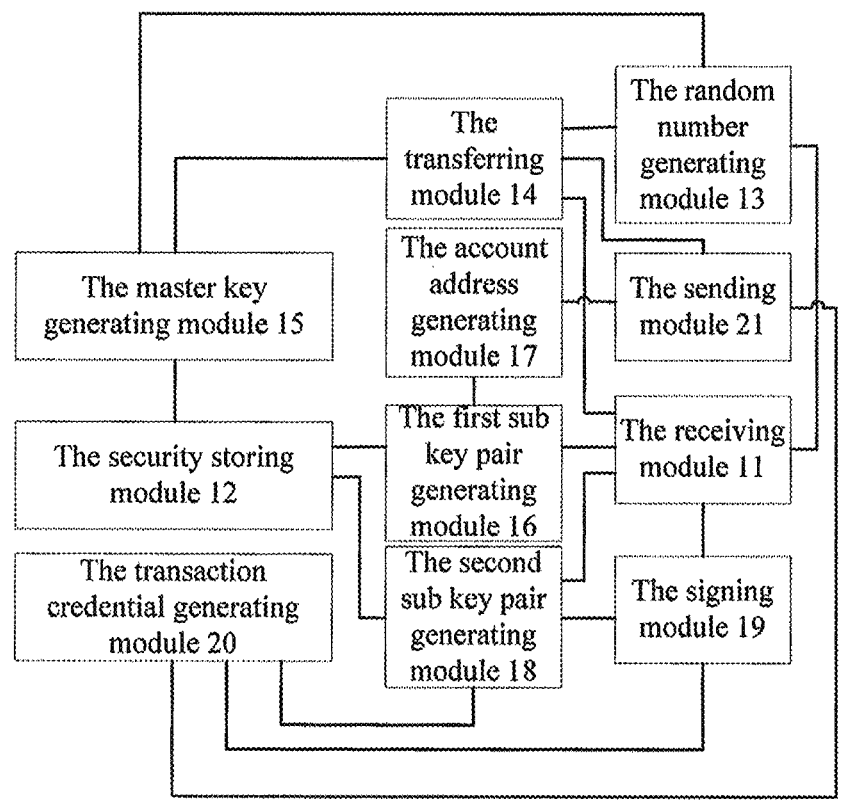
FIG. 4 shows a block diagram of a hardware wallet according to Embodiment 3 of the present invention.

It provides a hardware wallet according to Embodiment 3, as shown in FIG. 4, including a receiving module 11 which is configured to receive an instruction from an upper computer;

specifically, the receiving module 11 is configured to receive the instruction from the upper computer, when the instruction is received, the receiving module 11 obtains data on a first preset field of the instruction, and makes the data as the instruction type identification, and determines type of the instruction according to the instruction type identification, in the case that the instruction type identification is a first preset instruction type identification, the type of the instruction is a hardware wallet building instruction; in the case that the instruction type identification is a second preset instruction type identification, the type of the instruction is a hardware wallet restoring instruction; in the case that the instruction type identification is a third preset instruction type identification, the type of the instruction is an inquiring account balance instruction; in the case that the instruction type identification is a fourth preset instruction type identification, the type of the instruction is a transaction instruction;

a security storing module 12, which is configured to store a master key; which is specifically configured to store the master key generated by a master key generating module 15;

a first sub key pair generating module 16, which is configured to generate a sub key pair according to the master key saved in the security storing module 12 and the preset sub key index via the key deriving algorithm when the receiving module 11 receives the inquiring balance instruction sent from the upper computer;

furthermore, the first sub key generating module specifically includes a public key generating sub module, which is configured to generate a public key according to the master key saved in the security storing module 12;

a setting sub module, which is configured to set the current sub key index as the preset value;

a sub key pair deriving sub module, which is configured to derive the sub key pair according to the sub key index set by the setting sub module and the master key saved in the security storing module 12 via the key deriving algorithm; is further configured to derive the sub key pair according to an sub key index updated by an updating module and the master key saved in the security storing module 12 via the key deriving algorithm when a determining sub module determines that the sub key index updated by the updating module is smaller than the preset value;

an account address generating sub module, which is configured to generate an account address according to the sub public key in the sub key pair generated by the sub key pair deriving sub module via the preset algorithm;

furthermore, the account address generating sub module is configured to generate the first data and make the first data as the account address by successively executing SHA256 and RIPEMD160 operation and a coding operation on the sub key generated by the sub key pair deriving sub module;

a binding sub module, which is configured to bind the account address generated by the account address generating sub module with the sub key index, and write them into the sub key index table;

an updating sub module, which is configured to update the current sub key index;

a determining sub module, which is configured to determine whether the sub key index updated by the updating module is smaller than the preset value;

correspondingly, a sending module 21, which is configured to return the sub key index table to the upper computer in the case that the sub key index updated by the updating module is not smaller than the preset value;

an account address generating module 17, which is configured to generate the account address according to the sub public key in the sub key pair which is generated by the first sub key pair generating module 16;

a second sub key pair generating module 18, which is configured to generate the sub key pair according to the sub key index in the transaction instruction and the master key saved in the security storing module 12 via the key deriving algorithm when the receiving module 11 receives the transaction instruction sent from the upper computer;

furthermore, the second sub key pair generating module 18 is specifically configured to, when the receiving module 11 receives the transaction instruction sent from the upper computer, generate the public key according to the master key in the security storing module 12, and to generate the sub key pair according to the public key and the sub key index in the transaction instruction via the key deriving algorithm;

a signing module 19, which is configured to use the sub private key in the sub key pair, which is generated by the second sub key pair generating module 18, to sign on the transaction data in the transaction instruction received by the receiving module 11 to obtain a signature result;

a transaction credential generating module 20, which is configured to generate a transaction credential according to the sub public key in the sub key pair generated by the second sub key pair generating module 18 and the signature result generated by the signing module 19;

furthermore, the transaction credential generating module 20 is specifically configured to calculate to obtain a length of the transaction credential according to the sub public key in the sub key pair generated by the sub key generating module, a length of the sub public key, the signature result generated by the signing module 19, and a length of the signature result, and to generate a transaction credential by successively jointing the length of the transaction credential, the length of the sub public key, the sub public key, the length of the signature result and the signature result;

a sending module 21, which is configured to bind the account address generated by the account address generating module 17 with the preset sub key index, and send them to the upper computer; is further configured to send the transaction credential generated by the transaction credential generating module 20 to the upper computer; is further configured to send a mnemonic phrase generated by a transferring module 14 to the upper computer;

a random number generating module 13, which is configured to generate a random number when the receiving module 11 receives a hardware wallet building instruction from the upper computer, and to make the random number as a key seed;

the transferring module 14, which is configured to transfer the key seed generated by the random generating module 13 into the mnemonic phrase via a preset dictionary; is further configured to transfer the mnemonic phrase in a hardware wallet restoring instruction into the key seed according to the preset dictionary when the receiving module 11 receives the hardware wallet restoring instruction;

specifically, the transferring module 14 is configured to transfer the key seed generated by the random number generating module 13 into the mnemonic phrase via the preset dictionary; is further configured to transfer the mnemonic phrase into the mnemonic phrase identification according to the preset dictionary when the receiving module 11 receives the hardware wallet restoring instruction; a length of the key seed is obtained according to the length of the mnemonic phrase identification, data whose length equals the length of the key seed is orderly obtained from the mnemonic phrase and is made as the key seed.

Specifically, the random number generating module 13 is configured to generate a random number of a first preset length and to make the random number as the key seed when the receiving module 11 receives the hardware wallet building instruction from the upper computer;

Correspondingly, the transferring module 14 specifically includes:

a mnemonic phrase identification generating sub module, which is configured to obtain a first check value via a second preset algorithm according to the key seed generated by the random number generating module 13, and joint the key seed and the first check value to obtain the mnemonic phrase identification;

furthermore, the mnemonic phrase identification generating sub module is specifically configured to obtain a calculation result according to the key seed generated by the random number generating module 13 via the second preset algorithm, to calculate to obtain the length of the check value according to the first preset length, to intercept data whose length equals the length of the check value from the calculation result as the first check value, and to join the key seed and the first check value to obtain the mnemonic phrase identification;

a transferring sub module, which is configured to transfer the mnemonic phrase identification generated by the mnemonic phrase identification generating sub module into the mnemonic phrase via the preset dictionary;

a master key generating module 15, which is configured to generate the master key according to the key seed generated by the random number generating module 13 via the first preset algorithm; is further configured to generate the master key according to the key seed generated by the transferring module 14 via the first preset algorithm;

in the case that the hardware wallet instruction received by the receiving module 11 includes a hardware wallet password, the hardware wallet further includes a first determining module, which is configured to determine whether the hardware wallet password in the hardware wallet building instruction is legitimate when the receiving module 11 receives the hardware wallet building instruction sent from the upper computer;

a random number generating module 13 is specifically configured to generate a random number when the first determining module determines that the hardware wallet password in the hardware wallet building instruction is legitimate, and make the random number as the key seed;

an error prompting module, which is configured to prompt that the password is incorrect when the first determining module determines that the hardware wallet password in the hardware wallet building instruction is not legitimate.

In the case that the hardware wallet building instruction received by the receiving module 11 includes the length of the mnemonic phrase, the random number generating module 13 is specifically configured to calculate to obtain the length of the key seed according to the length of the mnemonic phrase in the hardware wallet building instruction, generate the random number whose length equals the length of the key seed, and to make the random number as the key seed;

furthermore, the random number generating module 13 is specifically configured to calculate to obtain the length of the key seed and the length of the check value according to the length of the mnemonic phrase in the hardware wallet building instruction, generate the random number whose length equals the length of the key seed, and to make the random number as the key seed;

correspondingly, the transferring module 14 specifically includes that a mnemonic phrase identification generating sub module, which is configured to obtain the first check value according to the key seed generated by the random number generating module 13 via a second preset algorithm, and join the key seed and the first check value to obtain the mnemonic phrase identification;

furthermore, the mnemonic phrase identification generating sub module is specifically configured to calculate to obtain a calculation result according to the key seed generated by the random number generating module 13 via the second preset algorithm, intercept orderly data whose length equals the length of the check value from the calculation result as the first check value, join the key seed with the first check value to obtain the mnemonic phrase identification;

furthermore, the transferring sub module is configured to transfer the mnemonic phrase identification generated by the mnemonic phrase identification generating sub module into the mnemonic phrase via the preset dictionary;

furthermore, the transferring sub module is specifically configured to successively intercept data whose length equals the second preset length from the mnemonic phrase identification generated by the mnemonic phrase identification generating sub module as mnemonic word identifications, look up mnemonic words corresponding to the mnemonic word identifications from the preset dictionary, and successively combine the mnemonic words to obtain the mnemonic phrase;

furthermore, the master key generating module 15 is specifically configured to use the preset character string as a hash key, calculate to obtain a hash value of the key seed generated by the random number generating module 13 according to the second preset algorithm, and make data on the high-order bit of the hash value as the master key.

In the case that the hardware wallet building instruction received by the receiving module 11 further includes a language type of the mnemonic phrase;

correspondingly, the transferring module 14 is specifically configured to transfer the key seed generated by the random number generating module 13 into the mnemonic phrase via the dictionary corresponding to the language type of the mnemonic phrase.

Preferably, the hardware wallet further includes a second determining module which is configured to determine whether the number of the mnemonic words in the mnemonic phrase in the hardware wallet restoring instruction is more than the third preset value in the case that the receiving module 11 receives the hardware wallet restoring instruction;

correspondingly, the transferring module 14 is configured to transfer the seed key generated by the random number generating module 13 into the mnemonic phrase via the preset dictionary; is further configured to transfer the mnemonic phrase in the hardware wallet restoring instruction into the key seed via the preset dictionary in the case that the second determining module determines that the number of the mnemonic words in the mnemonic phrase in the hardware wallet restoring instruction is not more than the third preset value;

correspondingly, the sending module 21 is specifically configured to send an error response to the upper computer when the second determining module determines that the number of the mnemonic words in the mnemonic phrase is more than the third preset value.

Preferably, the hardware wallet further includes a third determining module, which is configured to determine the language type of the mnemonic phrase according to the mnemonic phrase in the hardware wallet restoring instruction, and determine whether the language type of the mnemonic phrase is in the preset language types scope;

correspondingly, the transferring module 14 is configured to transfer the key seed generated by the random number generating module 13 into the mnemonic phrase via the preset dictionary; is further configured to transfer the mnemonic phrase in the hardware wallet restoring instruction into the key seed via the preset dictionary when the third determining module determines that the language type of the mnemonic phrase is in the scope of the preset language types;

correspondingly, the sending module 21 is specifically configured to send the error report to the upper computer when the third determining module determines that the language type of the mnemonic phrase is not in the scope of the preset language types.

More specifically, the third determining module specifically includes a determining language type sub module, which is configured to determine the language type of the mnemonic phrase according to an Unicode of one mnemonic word in the mnemonic phrase in the hardware wallet restoring instruction when the receiving module 11 receives the hardware wallet restoring instruction;

the third determining module is configured to determine whether the language type of the mnemonic phrase determined by the determining language type sub module is in the preset language types scope.

Preferably, the transferring module 14 is specifically configured to transfer the key seed generated by the random number generating module 13 into the mnemonic phrase via the preset dictionary; is further configured to transfer the mnemonic phrase into the mnemonic phrase identification according to the preset dictionary when the receiving module 11 receives the hardware wallet restoring instruction; to obtain the key seed and the second check value from the mnemonic phrase identification;

furthermore, the transferring module 14 is specifically configured to transfer the key seed generated by the random number generating module 13 into the mnemonic phrase via the preset dictionary; is further configured to transfer the mnemonic phrase into the mnemonic phrase identification according to the preset dictionary when the receiving module 11 receives the hardware wallet restoring instruction; to obtain orderly the data whose length equals the length of the key seed from the mnemonic phrase identification as the key seed, and make the left data of the mnemonic phrase identification as the second check value.

The hardware wallet further includes a check value generating module which is configured to generate the third check value according to the key seed obtained by the transferring module 14;

furthermore, the check value generating module is configured to execute operation on the key seed obtained from the mnemonic phrase identification by using the first preset algorithm to obtain a calculation result, and orderly intercept data whose length equals the length of the check value from the calculation result as the third check value.

a fourth determining module, which is configured to determine whether the second check value obtained by the transferring module 14 from the mnemonic phrase identification matches with the third check value generated by the check value generating module;

the master key generating module 15 which is configured to generate the master key from the key seed generated by the random number generating module 13 via the first preset algorithm; is further configured to generate the master key from the key seed obtained from the mnemonic phrase in the transferring module 14 via the first preset algorithm when the fourth determining module determines the second check value matches the third check value.

Preferably, the hardware wallet further includes a fifth determining module which is configured to determine whether the master key exists in the security storage area when the receiving module 11 receives the balance inquiring instruction sent from the upper computer;

a first sub key pair generating module 16, which is configured to generate the sub key pair according to the master key saved in the security storage area and the preset sub key index via the key deriving algorithm when the fifth determining module determines that the master key exists in the security storing module 12;

the sending module 21 which is configured to send a failure response to the upper computer when the fifth determining module determines the master key does not exist in the security storage area.

Preferably, the hardware wallet further includes a sixth determining module which is configured to determine whether a master key exists in the security storing module 12 when the receiving module 11 receives a transaction instruction sent from the upper computer;

a second sub key pair generating module 18 which is configured to generate the sub key pair according to the sub key index in the transaction instruction and the master key saved in the security storing module 12 via the key deriving algorithm when the sixth determining module determines that the master key is saved in the security storing module 12;

correspondingly, the sending module 21 is further configured to send the failure response to the upper computer when the sixth determining module determines that the master key does not exist in the security storing module 12.

Apparently, Embodiments described herein are just a few Embodiments of the present invention. On the basis of Embodiments of the invention, all other related Embodiments made by those skilled in the art without any inventive work belong to the scope of the invention.

The invention claimed is:

1. A method for realizing a digital currency wallet via a hardware wallet, the method comprising:
    executing Step S1, wherein Step S1 comprises: waiting, by a hardware wallet, for receiving an instruction from an upper computer, executing Step S2 in the case that a balance inquiring instruction is received; executing Step S3 in the case that a transaction instruction is received; executing Step S4 in the case that a hardware wallet building instruction is received; and executing Step S5 in the case that a hardware wallet restoring instruction is received;
    receiving, by the hardware wallet, the balance inquiring instruction and executing Step S2, wherein Step S2 comprises: generating by the hardware wallet, a sub key pair according to a master key in a security storage area and a preset sub key index via a key deriving algorithm, generating an account address according to a sub pubic key in the sub key pair, and binding the account address with the sub key index and returning them to the upper computer;
    receiving, by the hardware wallet, the transaction instruction and executing Step S3, wherein Step S3 comprises: generating, by the hardware wallet, a sub key pair according to the master key in the security storage area and a sub key index in the transaction instruction via the key deriving algorithm, signing on transaction data in the transaction instruction by using a sub private key of the sub key pair to obtain a signature result, and generating a transaction credential according to the sub public key of the sub key pair and the signature result, and returning the transaction credential to the upper computer;
    wherein all operations involving the sub private key are executed inside the hardware wallet;
    receiving, by the hardware wallet, the hardware wallet building instruction and executing Step S4, wherein Step S4 comprises: generating, by the hardware wallet, a random number as a key seed, transferring the key seed into a mnemonic phrase via a preset dictionary, generating a master key according to the key seed via a first preset algorithm, storing the master key into the security storage area, and returning the mnemonic phrase to the upper computer; and
    receiving, by the hardware wallet, the hardware wallet restoring instruction and executing Step S5, wherein Step S5 comprises: transferring, by the hardware wallet, the mnemonic phrase in the hardware waist restoring instruction into the key seed according to the preset dictionary, generating the master key according to the key seed via the first preset algorithm, and storing the master key into the security storage area;
    wherein the hardware wallet generating the sub key pair according to the master key in the security storage area and the preset sub key index via the key deriving algorithm specifically comprises:
    Step 401, generating, by the hardware wallet, a pubic key according to the master key in the security storage area, and setting the current sub key index as a preset value;
    Step 402, generating, by the hardware wallet, the sub key pair according to the public key and the current sub key index via the key deriving algorithm;
    Step 403, generating, by the hardware wallet, an account address according to the sub pubic key in the sub key pair via the preset algorithm, and binding the account address with the current sub key index and writing them into a sub key index table; and
    Step 404, updating, by the hardware wallet, the current sub key index, and determining whether the current sub key index is smaller than the preset value; if yes, returning to Step 402, otherwise, returning the sub key index table to the upper computer.

2. The method as claimed in claim 1, wherein the hardware wallet buking instruction comprises a hardware wallet password, and the method further comprises:
    after the hardware wallet building instruction is received, before Step S4 is executed, obtaining, by the hardware wallet, the hardware wallet password from the hardware wallet building instruction, and determining whether the hardware wallet password is legitimate; if yes, executing Step S4, otherwise, prompting that the hardware wallet password is incorrect.

3. The method as claimed in claim 1, wherein the hardware wallet generating a random number as a key seed, and transferring the key seed into the mnemonic phrase via the preset dictionary specifically comprises:

Step 101, generating, by the hardware wallet, the random number whose length equals a first preset length, and making the random number as the key seed; and Step 102, obtaining, by the hardware wallet, a first check value according to the key seed via a second preset algorithm; joining the key seed and the first check value so as to obtain a mnemonic phrase identification; and transferring the mnemonic phrase identification into the mnemonic phrase via the preset dictionary.

4. The method as claimed in claim 1, wherein the hardware wallet building instruction comprises a length of the mnemonic phrase and the hardware wallet generating the random number as the key seed, and transferring the key seed into the mnemonic phrase via the preset dictionary specifically comprises;

Step 201, calculating, by the hardware wallet, to obtain the length of the key seed according to the length of the mnemonic phrase, generating the random number whose length equals the length of the key seed, and making the random number as the key seed; and Step 202, obtaining, by the hardware wallet, a first check value according to the key seed via a second preset algorithm; joining the key seed with the first check value so as to obtain a mnemonic phrase identification; and transferring the mnemonic phrase identification into the mnemonic phrase according to the preset dictionary.

5. The method as claimed in claim 1, wherein the hardware wallet transferring the mnemonic phrase in the hardware wallet restoring instruction into the key seed according to the preset dictionary specifically comprises the hardware wallet transferring the mnemonic phrase Into the mnemonic phrase identification according to the preset dictionary; calculating to obtain the length of the key seed according to the length of the mnemonic phrase identification, and obtaining orderly data whose length equals the length of the key seed from the mnemonic phrase identification as the key seed.

6. The method as claimed in claim 1, wherein generating the account address according to the sub public key in the sub key pair specifically comprises the hardware wallet executing SHA256 operation, RIPEMD160 operation and coding operation successively on the sub pubic key to generate a first data, and making the first data as the account address.

7. The method as claimed in claim 1, wherein the hardware wallet generating the sub key pair according to the master key in the security storage area and the sub key index in the transaction instruction via the key deriving algorithm specifically comprises generating, by the hardware wallet, the public key according to the master key in the security storage area, and generating the sub key pair according to the pubic key and the sub key index via the key deriving algorithm.

8. The method as claimed in claim 1, wherein, generating the transaction credential according to the sub pubic key in the sub key pair and the signature result specifically comprises calculating, by the hardware wallet, to obtain a length of the transaction credential according to a length of the sub pubic key in the sub key pair, the sub public key, a length of the signature result and the signature result; and orderly joining the length of the transaction credential, the length of the sub pubic key, the sub pubic key, the length of the signature result and the signature result so as to generate the transaction credential.

9. A hardware wallet, comprising:
a processor;
a receiving module, a security storing module, a first sub key pair generating module, an account address generating module, a second sub key pair generating module, a random number generating module, a transferring module, and a master key generating module, wherein the first sub key pair generating module comprises a public key generating sub module, a setting sub module, a sub key pair deriving sub module, an account address generating sub module, a binding sub module, an updating sub module, a determining sub module, and the sending module; and
a memory storing executable instructions that when executed by the processor cause the processor to perform the following steps:
receiving, via the receiving module, an instruction from an upper computer;
storing, via the security storing module, a master key;
generating, via the first sub key pair generating module, a sub key pair according to the master key saved in the security storing module and a preset sub key index via a key deriving algorithm when to receiving module receives a balance inquiring instruction from the upper computer;
generating via the account address generating module, the account address according to the sub public key in the sub key pair generated by the first sub key pair generating module;
generating, via the second sub key pair generating module, a sub key pair according to a sub key index in a transaction instruction and the master key saved in the security storing module via the key deriving algorithm when the receiving module receives the transaction instruction sent from the upper computer;
signing, via the signing module, on transaction data in the transaction instruction received by the receiving module by using a sub private key generated by the second sub key pair generating module;
generating, via the transaction credential generating module, a transaction credential by using the sub public key in the sub key pair generated by the second sub key pair generating module and the signature result generated by the signing module; and
binding, via the sending module, the account address generated by the second sub key pair generating module with the preset sub key index, sending, via the sending module, them to the upper computer, and sending, via the sending module, the transaction credential generated by the transaction credential generating module to the upper computer;
generating, via the random number generating module, a random number when the receiving module receives the hardware wallet building instruction from the upper computer, and making, via the random number generating module, the random number as the key seed;
transferring, via the transferring module, the key seed generated by the random number generating module into a mnemonic phrase via a preset dictionary, and transferring, via the transferring module, the mnemonic phrase in the hardware wallet building instruction into the key seed according to the preset dictionary when the receiving module receives the hardware wallet restoring instruction;

generating, via the master key generating module, a master key by using the key seed generated by the random number generating module via a first preset algorithm, and generating, via the master key generating module, the master key by using the key seed generated by the transferring module via the first preset algorithm;

saving, via the security storing module, the master key generated by the master key generating module;

sending, via the sending module, the mnemonic phrase generated by the transferring module to the upper computer;

generating, via the pubic key generating sub module, a public key according to the master key saved in the security storing module;

setting, via the setting sub module, a current sub key index as the preset value;

generating, via the sub key pair deriving sub module, a sub key pair according to the sub key index set by the setting module and the master key saved in the security storing nodule via a key deriving algorithm, and generating, via the sub key pair deriving sub module, the sub key pair according to the sub key index updated by the updating module and the master key saved in the security storing module via the key deriving algorithm when a determining sub module determines that the sub key index updated by the updating module is smaller than the preset value;

generating, via the account address generating sub module, an account address according to the sub pubic key in the sub key pair generated by the sub key deriving sub module via a preset algorithm;

binding, via the binding sub module, the account address generated by the account address generating sub module with the sub key index, and writing, via the binding sub module, them into a sub key index table;

updating, via the updating sub module, the current sub key index;

determining, via the determining sub module, whether the sub key index updated by the updating module is smaller than the preset value; and returning, via the sending module, the sub key index table to the upper computer when the sub key index updated by the updating module is not smaller than the preset value; and executing inside the hardware wallet all operations involving the sub private key.

10. The hardware wallet as darned in claim 9, wherein the hardware wallet building instruction comprises the hardware wallet password, the hardware wallet further comprises a first determining module and an error prompting module, and the executable instructions when executed by the processor further cause the processor to perform the following steps:

determining, via the first determining module, whether the hardware wallet password in the hardware wallet instruction is legitimate when the receiving module receives the hardware wallet building instruction sent from the upper computer;

generating, via the random number generating module, a random number when the first determining module determines that the hardware wallet password in the hardware wallet building instruction is legitimate, and making via the random number generating module, the random number as the key seed; and prompting, via the error prompting module, that the hardware wallet password is incorrect when the first determining module determines that the hardware wallet password in the hardware wallet building instruction is not legitimate.

11. The hardware wallet as claimed in claim 9, wherein the hardware wallet further comprises a mnemonic phrase identification generating sub module and a transferring sub module, and the executable instructions when executed by the processor further cause the processor to perform the following steps:

generating, via the random number generating module, a random number whose length equals a first preset length when the receiving module receives the hardware wallet building instruction from the upper computer, and making, via the random number generating module, the random number as the key seed;

obtaining, via the mnemonic phrase identification generating sub module, a first check value according to the key seed generated by the random number generating module via a second preset algorithm, and joining, via the mnemonic phrase identification generating sub module, the key seed with the first check value so as to obtain a mnemonic phrase identification; and transferring, via the transferring sub module, the mnemonic phrase identification generated by the mnemonic phrase identification generating sub module into a mnemonic phrase via a preset dictionary, wherein the transferring module comprises the mnemonic phrase identification generating sub module and the transferring sub module.

12. The hardware wallet as claimed in claim 9, wherein the hardware wallet building instruction comprises a length of the mnemonic phrase, the hardware wallet further comprises a mnemonic phrase identification generating sub module and a transferring sub module, and the executable instructions when executed by the processor further cause the processor to perform the following steps:

calculating, via the random number generating module, to obtain a length of the key seed according to the length of the mnemonic phrase in the hardware wallet building instruction, generating, via the random number generating module, a random number whose length equals the length of the key seed, and making, via the random number generating module, the random number as the key seed;

obtaining, via the mnemonic phrase identification generating sub module, a first check value according to the key seed generated by the random number generating module via a second preset algorithm, and joining, via the mnemonic phrase identification generating sub module, the key seed with the first check value so as to obtain a mnemonic phrase identification; and transferring, via the transferring sub module, the mnemonic phrase Identification generated by the mnemonic phrase identification generating sub module into a mnemonic phrase via a preset dictionary, wherein the transferring module comprises the mnemonic phrase identification generating sub module and the transferring sub module.

13. The hardware wallet as claimed in claim 9, wherein the executable instructions when executed by the processor further cause the processor to perform the following steps:

transferring, via the transferring module, the key seed generated by the random number generating module into the mnemonic phrase via the preset dictionary, transferring, via the transferring module, the mnemonic phrase into a mnemonic phrase identification according to the preset dictionary when the receiving module receives a hardware wallet restoring instruction, calculating, via the transferring module, to obtain the length of the key seed according to the length of the mnemonic phrase identification, and orderly obtaining, via the transferrin mode, data whose length equals the length of the key seed from the mnemonic phrase identification as the key seed.

14. The hardware wallet as claimed in claim 9, wherein the executable instructions when executed by the processor further cause the processor to perform the following steps:
generating, via the account address generating sub module, a first data by executing orderly SHA256 operation, RIPEMD160 operation and the coding operation, and making, via the account address generating sub module, the first data as the account address according to the sub pubic key generated by the sub key pair deriving sub module.

15. The hardware wallet as claimed in claim 11, wherein the executable instructions when executed by the processor further cause the processor to perform the following steps:
generating, via the second sub key pair generating module, pubic key according to the master key saved in the security storing module when the receiving module receives a transaction instruction set by the upper computer, and generating, via the second sub key pair generating module, the sub key pair according to the pub key and the sub key index in the transaction instruction via the key deriving algorithm.

16. The hardware wallet as claimed in claim 9, wherein the executable instructions when executed by the processor further cause the processor to perform the following steps:
calculating, via the transaction credential generating module, to obtain a length of the transaction credential according to the sub pubic key in the sub key pair generated by the sub key pair generating module, a length of the sub public key, a signature result generated by the signing module, and a length of the signature result, and orderly joining, via the transaction credential generating module, the length of the transaction credential, the length of the sub pubic key, the sub pubic key, the length of the signature result and the signature result so as to generate the transaction credential.

* * * * *